United States Patent

[11] 3,578,903

[72] Inventor Donald H. Willis
Indianapolis, Ind.
[21] Appl. No. 784,730
[22] Filed Dec. 18, 1968
[45] Patented May 18, 1971
[73] Assignee RCA Corporation

[54] CONTROL CIRCUITS FOR PREVENTING KINESCOPE COLOR SATURATION DURING BLOOMING

9 Claims, 1 Drawing Fig.

[52] U.S. Cl. .......... 178/5.4
[51] Int. Cl. .......... H04n 9/48
[50] Field of Search .......... 178/5.4
(ACC), (CK), 5.4, 7.5 (E)

[56] References Cited

UNITED STATES PATENTS

| | | | |
|---|---|---|---|
| 3,009,989 | 11/1961 | Ahrons et al. ................ | 178/7.5 |
| 3,072,741 | 1/1963 | Ahrons et al. ................ | 178/7.5 |
| 3,179,743 | 4/1965 | Ahrons et al. ................ | 178/7.5 |
| 3,272,915 | 9/1966 | Theriault ...................... | 178/5.4 |

*Primary Examiner*—Richard Murray
*Assistant Examiner*—John C. Martin
*Attorney*—Eugene M. Whitacre

ABSTRACT: In a color television receiver a condition arises where the load demands on deflection circuitry causes blooming during a color transmission. These increasing load demands are detected in the receiver and the detected signal is used to reduce the gain and therefore the drive supplied by the chroma amplifier to the kinescope. The result is to decrease the load demands on the deflection circuitry by decreasing the chroma drive to the kinescope.

PATENTED MAY 18 1971 3,578,903
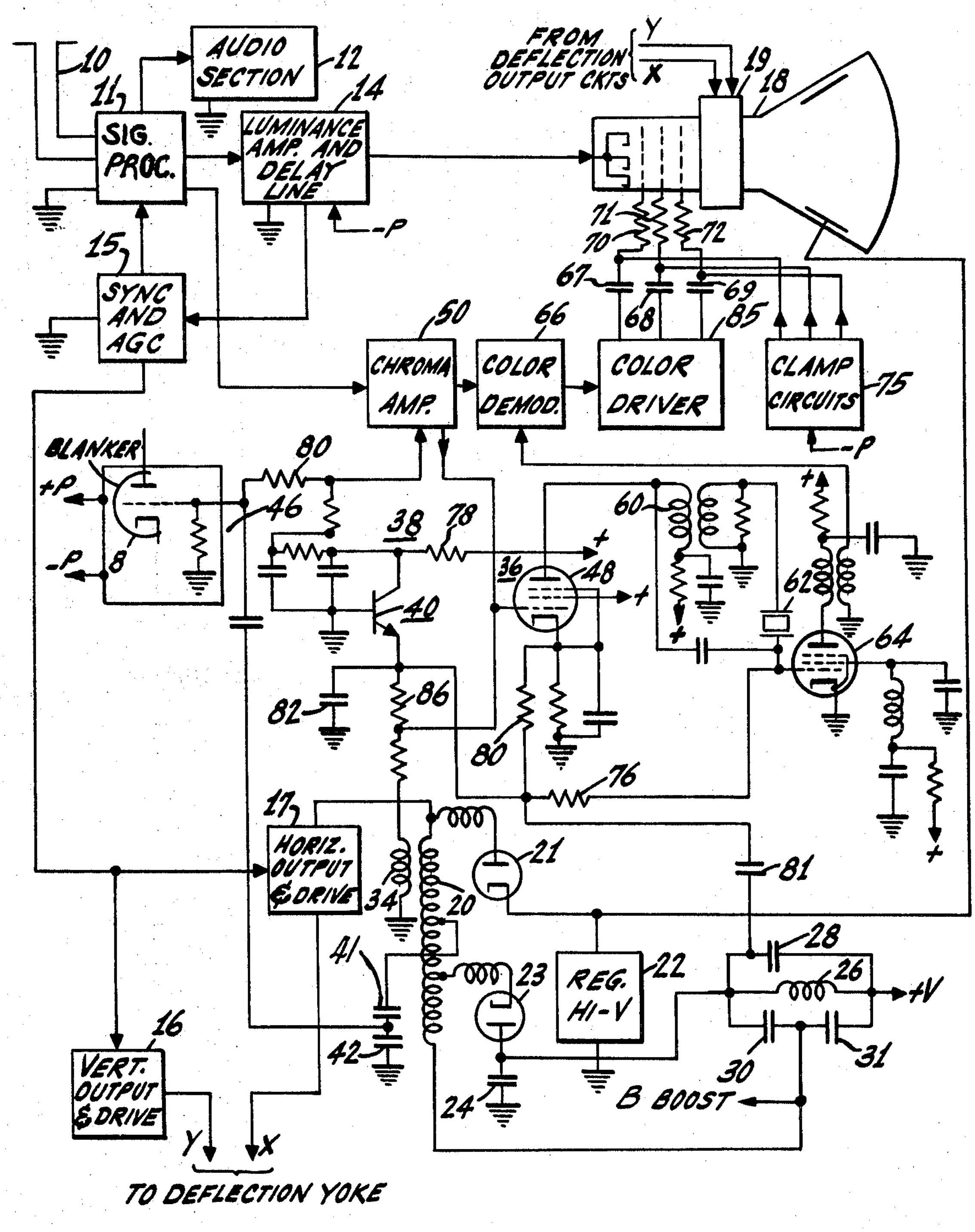
INVENTOR
DONALD H. WILLIS
BY Eugene M. Whitacre
ATTORNEY

CONTROL CIRCUITS FOR PREVENTING KINESCOPE COLOR SATURATION DURING BLOOMING

COLOR AMPLITUDE CONTROL CIRCUITS

This invention relates to color television receivers and more particularly to chroma amplifier control circuitry included therein.

In a television receiver a condition can arise where the kinescope employed therein, draws an excessive amount of bema current. This condition loads the horizontal circuitry, which is usually the major supply of operating potential for the kinescope. The effect, which can be observed on the viewing screen of the kinescope, caused by an excessive beam current mode, is sometimes referred to, in the art, as blooming.

Basically, blooming on a monochrome scene is evidenced by changes in spot size and can in turn result in changes in picture size, brightness, and an overall distortion of the displayed scene. While, as indicated, blooming can occur in a monochrome receiver and produce adverse effects, it can also occur in a compatible color receiver, which with automatic color control (ACC) will serve to degenerate the picture even further. The difficulty arises due to the following conditions.

As certain color television receivers begin to bloom because of the increased kinescope current, the horizontal output circuitry and transformer becomes loaded. The horizontal circuitry in a receiver is also a source of keying pulses for various keyed operations, operating during the horizontal retrace interval, such as blanking, clamping and so on. Therefore because of the loading of the horizontal circuitry the magnitude of such keying pulses, during blooming, decreases.

In a color receiver a burst separator is used to retrieve the color burst signal during a color transmission. The burst separator is keyed on by one of the above pulses occuring during the horizontal interval. The decrease in magnitude of the keying pulse causes the burst separator to provide at its output a smaller magnitude burst signal.

An ACC circuit operates in a receiver to monitor the magnitude of the burst signal and alter the gain of the chrominance amplifier included in a color receiver to provide a constant output therefrom for varying burst amplitude. Therefore, a decrease in the amplitude of the burst signal due to blooming would cause the ACC circuit to attempt to raise the gain of the chroma amplifier and therefore further load the kinescope and horizontal circuitry.

A circuit embodying the invention monitors the amplitude variations due to increasing load demands on the kinescope and provides a signal voltage proportional to such variations. This signal voltage is applied to the chroma amplifier chain and controls the gain of the chain according to the signal level to thereby prevent an undesireable increase in drive by the chrominance amplifier and therefore to the kinescope.

During a condition where the kinescope begins to draw excessive beam current, for a color transmission, the voltage across the efficiency coil in the horizontal deflection circuitry increases. This increase in voltage is used to inhibit the automatic color control (ACC) signal from raising the gain of the chroma amplifier. Thus the gain of the chroma amplifier is limited or even reduced during a bloom condition, irrespective of the fact that the amplitude of the burst signal across the output of the burst separator decreases.

The sole FIGURE of the drawings is a schematic circuit diagram partially in block form of a color television receiver operating in accordance with this invention.

Referring to the FIGURE, a television antenna 10 is coupled to the input terminals of a module 11. The module 11 includes the tuner, the intermediate frequency (I.F.) amplifier, the video detector and the intercarrier sound detector.

The detected sound is applied to the audio section 12 of the receiver. The detected video signal is applied to the luminance amplifier and delay line 14 whose output is coupled to the cathode electrodes of the kinescope 18, which may be a three gun shadow mask device.

An output terminal from a suitable section of the luminance amplifier 14 is coupled to synchronizing and AGC circuits 15. The synchronizing pulse components of the video signal are used to control deflection generators included in the vertical output and drive circuits 16 and the horizontal output and drive circuits 17. The vertical and horizontal deflection generators provide signals which are amplified and coupled to a deflection coil 19 associated with the kinescope 18.

The horizontal output and drive circuits 17 are also coupled to a high voltage transformer 20 which provides high voltage pulses for the development of operating potentials to be applied to electrodes of the kinescope 18. A high voltage rectifier or diode 21 has its anode electrode coupled to transformer 20 and its cathode electrode coupled to the ultor electrode of the kinescope 18. Diode 21 serves to rectify the high voltage retrace pulses to develop the necessary high DC voltage at the ultor or second anode electrode of the kinescope 18. Other taps, not shown, are provided on transformer 20 for the generation of suitable magnitude focusing voltage, screen supply potential and so on. The high voltage as applied to the ultor is usually regulated by means of a shunt or other type regulator 22.

Also coupled to a tap on the primary winding of transformer 20 is the cathode electrode of a damper diode 23. The anode electrode of damper diode 23 is coupled to ground through a filtering capacitor 24 and is also coupled to a source of potential labeled +v. through an inductor 26. Inductor 26 is shunted by capacitor 28 and the series combination of capacitors 30 and 31. The junction between capacitors 30 and 31 is brought out by a lead which is generally designated as B boost.

The damper diode 23, inductor 26, capacitors 28, 30 and 31 also serve as an energy recovery system for increasing the efficiency of the horizontal deflection system, as is well known in the art. See, for example an article entitled "Magnetic Deflection Circuits for Cathode-Ray Tubes" by O.H. Schade, RCA Review, Volume VIII, page 506, Sept. 1947.

A secondary winding 34 on the transformer 20 is used as a source of keying pulses for the burst separator 36. The burst separator 36 generally comprises a pentode 48 or some other suitable vacuum tube or transistor circuit which is gated by the horizontal retrace pulse to conduct during this interval. During color transmissions the video signal coupled to the input terminal of the chroma amplifier 50 contains a color burst whose phase and frequency are representative of the phase and frequency of a color subcarrier oscillator signal. In this manner the chrominance signal as amplified by an early stage of the multiple stage chroma amplifier 50 is coupled to the grid electrode of pentode 48 which also receives the gating signal during the horizontal synchronizing period. Pentode 48 is thereby caused to conduct and hence serves to amplify the burst signal, when present, to provide across a transformer or other circuit load 60, coupled to the plate electrode of pentode 48, the amplified burst signal. The burst signal as amplified is applied to a crystal 62, designed to resonate at the color subcarrier frequency. The crystal 62 is coupled to the grid electrode of an injection locked oscillator circuit comprising a pentode 64.

In a well-known manner the oscillator including the pentode 64 is synchronized to the color burst signal. The synchronized signal output from the oscillator is coupled to color demodulators 66 which also receive an input from the chrominance amplifier chain 50.

The color demodulators 66 function to demodulate the chroma signal with respect to the synchronizing oscillator signal to provide at the outputs suitable color difference signals (R–Y, B–Y and G–Y). These signals are coupled to suitable input electrodes, such as the grids, of the kinescope 18 through coupling capacitors 67, 68 and 69. Due to the fact that the coupling capacitors remove the DC component associated with such color difference signals, and this DC component is desirable for the color display, the junction between these coupling capacitors 67 to 69 and suitable current limiting resistors such as 70, 71 and 72 are coupled to the outputs of unidirectional or bidirectional clamping circuits 75. The clamping circuits 75 are operated by a suitable pulse (−P) usually derived from a blanker circuit 46, including an active device such as triode 8, and used to restore a DC potential across the coupling capacitors 67 to 69 representative of the DC component previously discarded. DC restoration therefore maintains suitable bias levels to the kinescope.

A capacitive divider comprising capacitors 41 and 42 is also coupled to a tap on the primary winding of transformer 20 and serves to provide a suitable pulse during horizontal retrace time for operating the blanker circuit 46. Generally, the main function of the blanker circuit 46 is to cutoff the luminance and chrominance channels during retrace time to prevent retrace lines and other transient distortion from appearing on the viewing screen of the kinescope 18.

An automatic color control circuit 38 is included in many conventional receivers. Basically, the function of the ACC circuit 38 is to monitor the amplitude of the burst signal; which amplitude is approximately representative of the proportional amplitude of the chrominance components contained in the composite video signal; and maintain the output of the chroma amplifier 50 constant in spite of amplitude variations not representative of scene changes which might occur in the chroma components during a color transmission.

A suitable ACC circuit 38 comprises a transistor 40. The emitter electrode of transistor 40 is coupled to the grid electrode of the color oscillator 64 via a resistor 76. The collector electrode is coupled to a source of suitable operating potentials (+v.₁) through a load resistor 78. The base electrode is grounded, operating transistor 40 in a common base configuration which therefore results in a high voltage gain without signal inversion. The transistor 40 provides a grid return path for the color oscillator 64 grid electrode, while providing at the collector electrode an amplified voltage that varies in the same sense as the rectified voltage at the oscillator grid electrode.

A suitable filtering network is also coupled between the collector electrode and ground to remove undesired frequency components from affecting the ACC response. The ACC output, taken from the collector of transistor 40, is coupled to a suitable input electrode of a stage included in chroma amplifier 50 to vary the gain of that stage in accordance with the DC fluctuations at the emitter electrode.

Such fluctuations are primarily due to variations in burst amplitude. Such suitable variations at the emitter electrode are obtained via the grid to cathode rectifying action of oscillator pentode 64. Due to the application of the burst signal through the crystal 62 the grid to cathode diode of pentode 64 provides a DC potential at the grid electrode of pentode 64 whose magnitude is a function of the amplitude of the incoming burst. This effect is well known and has been utilized in many prior art receivers.

Accordingly, as the burst amplitude varies, the DC voltage at the grid of pentode 64 varies, as does the emitter voltage of transistor 40. This action causes the voltage at the collector to vary resulting in gain control of the chrominance amplifier chain 50 according to burst amplitude.

The emitter electrode of transistor 40 is coupled to the grid leak resistor 86 for the burst amplifier 36 to provide improved noise operation. Without this connection noise pulses at the grid of the burst amplifier 36 would produce a voltage at the grid which in turn would reduce the gain of the burst amplifier 36.

The burst separator 36, color oscillator 64 and ACC transistor 40 circuits, thus described, with details of component values, appears in a publication entitled "RCA Television Service Date," Chassis CTC38, No. T18, Radio Corporation of America, RCA Sales Corporation, 600 North Sherman Drive, Indianapolis, Indiana, 1968, First Edition, First Printing.

In the above-described receiver there is a tendency of certain chassis to raise the chroma output due to blooming of the receiver because of excessive kinescope beam current. To compensate for this effect, which compensation will be explained subsequently, resistor 80 is coupled from the cathode of the burst amplifier 36 to the emitter electrode of the ACC transistor 40. A capacitor 81 is coupled between the emitter electrode of transistor 40 and the junction between capacitor 38, inductor 26 and the plate electrode of damper diode 23. The action of the circuit including these two components is as follows.

During a color transmission under certain conditions caused by changing component values, high temperature and so on, there is a possibility that the kinescope 18 will attempt to draw an abnormally large amount of beam current. As indicated this condition would tend to overload the horizontal circuitry including transformer 20 and generally cause blooming of the picture. This action, when commenced during a color transmission causes the following events to take place in an uncompensated receiver. The overload results in a reduced magnitude keying pulse at the secondary winding 34. This decrease in keying pulse amplitude causes reduced conduction of pentode 48 with a consequent decrease in gain. The pentode 48 therefore produces reduced burst amplitude across the plate load 60.

The decreased amplitude burst coupled to oscillator 64 causes a decrease in negative voltage at the grid electrode. The decreased negative voltage applied to the emitter electrode of ACC transistor 40 causes the collector electrode to be driven positively, thereby increasing the gain of the chroma amplifier 50. As a result, the kinescope 18 is driven even harder thereby loading the horizontal circuitry to a greater extent.

The reduced amplitude keying pulse is also applied to the control electrode of the triode 8 in the blanker circuit 46 causing less negative control electrode voltage to be developed. This negative voltage is applied to an early stage of the chroma amplifier chain 50 as a bias voltage via resistor 80. When the negative voltage decreases, because of blooming, the gain of the particular chroma amplifier stage 50 increases and, therefore, undesirably further contributes to the increased kinescope loading.

During normal receiver operation a periodic wave which is approximately sinusoidal appears across the horizontal efficiency coil 26. The amplitude of this wave for a typical receiver is of the order of approximately 120 volts peak to peak and its frequency is at the horizontal scan rate (15,750 Hz.). This wave is applied across the series combination of capacitors 81 and 82. The values of the capacitors 81 and 82 are selected so that a 1.5 volt peak to peak wave appears across the capacitor 82 and is applied to the emitter electrode of transistor 40. The negative peaks of the 1.5 volt wave are clamped to −0.6 volts with respect to ground. This clamping action causes the effective DC voltage of the emitter electrode of transistor 40 to be raised from −0.6 volts to +0.15 volts. A resistor 80 is connected from the cathode of the burst amplifier tube 48 to the emitter electrode of transistor 40. Since the cathode of the burst amplifier tube 48 is normally operated at approximately +50 volts DC, the resistor 80 compensates for current which might otherwise flow due to the coupling of the AC signal from the efficiency coil. The ACC control range, is usually provided by transistor 40, is the same as it was prior to the application of the wave from the efficiency coil.

During the condition known as blooming, certain changes occur in the waveforms produced by the horizontal deflection circuitry. Due to the loading caused by the increase in kinescope current, the amplitude of the keying pulse impressed on the grid of the burst amplifier pentode 48 is reduced. Furthermore, the horizontal flyback transformer system becomes detuned in such a manner as to cause the amplitude of the wave across the horizontal efficiency coil 26 to increase. This phenomenon is known in the art, for example, see U.S. Pat. No. 2,871,288, entitled "Stabilized AGC System" by L.P. Thomas, issued on Jan. 27, 1959.

The reduction in the keying pulse amplitude causes the DC voltage during the retrace interval at the cathode electrode of burst amplifier 36 to decrease; which action reduces the current through resistor 80. The reduction of current through resistor 80 causes increased current thru the emitter electrode of transistor 40. The increase in the voltage across the efficiency coil 26 results in a larger amplitude peak-to-peak wave impressed on the emitter electrode of transistor 40 via capacitor 81. This effectively causes increased DC current to flow through the emitter electrode of transistor 40. The increased current flow results in an increase in the collector current of transistor 40. At the same time, the reduced keying voltage applied to burst amplifier 48 causes the cathode to become less positive. Thus both the addition of capacitor 81 and resistor 80 results in increased DC current through the ACC transistor 40 during the blooming condition while further providing normal current therethrough for normal operation. The increase in emitter current is in a direction to provide a voltage at the collector which tends to reduce the gain of the chroma amplifier 50. This therefore can correct or overcorrect the tendency for the drive to the kinescope 18 to increase during a blooming mode of operation in the color receiver.

The circuit shown herein operated according to the description provided above with the addition of capacitor 81 specified as 0.0012 microfarads and resistor 80 specified as 3.3 megohms.

I claim:

1. In a television receiver adapted to receive color television signal transmissions and having a gain controllable chroma amplifying channel responsive to color information components contained in said signal and for applying said information to a control electrode of a color kinescope, said receiver including deflection circuit means for said kinescope and means coupled to said deflection circuit means for providing operating potentials for said kinescope and including other means coupled to said deflection circuit means for providing keying pulses, said keying pulses and operating potentials both being subjected to variations due to increasing load demands on said deflection circuit means, said variations in amplitude of said keying pulses further causing an undesired increase in the saturation of colors displayed by said kinescope, comprising therewith, a. first means coupled to said deflection circuit means for providing at an output terminal thereof a control signal having a level representative of said amplitude variations, b. second means coupling said first means to said chroma amplifying channel to decrease the gain of said channel in accordance with said control signal level, to maintain the amplitude of said color information components at a level to prevent undesired color saturation of said kinescope display during said increasing load demands.

2. In a television receiver adapted to receive color television signal transmission, and having a chroma channel responsive to color information components contained in said signals, said receiver including automatic color control means coupled to said chroma amplifier channel for varying the gain of said channel according to the amplitude of a burst signal provided by a burst separator circuit keyed by a pulse generated by deflection circuit means for a color kinescope also included in said receiver, said burst amplitude being undesirably dependent upon the amplitude of said keying pulse which amplitude is subject to variations due to increasing load requirements on said deflection circuit means, comprising therewith, a. first means coupled to said deflection circuit means for providing at an output terminal thereof a signal level representative of said amplitude variations, b. second means coupling said first means to said chroma channel for applying to said chroma channel a selected amplitude of said signal level, whereby the gain of said channel is affected substantially equal and opposite to that gain control afforded by said automatic color control means, to maintain the level of said color information components at a level to prevent undesired color saturation of said kinescope during said increasing load requirements.

3. In combination with a television receiver adapted to receive color television signal transmission, said receiver being of the type including deflection circuit means for a kinescope, a power recovery circuit including an inductance coupled to said deflection circuit means for increasing the efficiency of said deflection circuit means, means for providing keying pulses from said deflection circuit means and rectifying circuit means coupled to said deflection circuit means for producing operating potentials for said kinescope, said operating potentials and said keying pulses being subjected to amplitude variations when said load demands by said kinescope increase, said increasing load demands resulting in an increase of a voltage developed across said inductance included in said power recovery circuit, apparatus for automatic color control comprising, a. a keyed burst separator responsive to said color television signals for separating therefrom a burst signal included in said signals in response to the application to said separator of one of said keying pulses, said separated burst signal having an amplitude at least partly dependent upon said amplitude of said keying pulse, b. control means coupled to said burst separator for providing at an output a control signal proportional to said burst signal amplitude and therefore to the amplitude of color information in said television signal, c. means coupled between said control means and said inductance for applying to said control means said voltage across said inductance of a magnitude to substantially compensate said control signal for any variations therein due to said amplitude variations as affecting said keying pulses.

4. Apparatus for automatic color control of a receiver adapted to receive color television signal transmissions, said receiver being of the type including deflection control circuit means for a kinescope, means coupled to said deflection means for providing keying pulses during a retrace interval and for applying said pulses to a burst separator for retrieving and amplifying a burst signal contained in said color television signal transmission in accordance with the amplitude of said keying pulse, means coupled to said deflection means for providing operating potentials for said kinescope, said operating potentials and said keying pulses both subject to amplitude variations due to increasing load demands on said deflection control means, the combination therewith comprising, a. a chroma amplifier channel responsive to color information contained in said composite signal, b. control means coupled to said burst amplifier for providing a control voltage at an output terminal thereof proportional to the amplitude of said burst signal, said output terminal coupled to said chroma amplifier for varying the gain thereof according to said burst amplitude, c. circuit means coupled to said deflection means and responsive to said amplitude due to said increasing demands on said deflection circuit means, for providing a voltage signal having a magnitude in accordance with said amplitude variations, d. coupling means between said circuit means and said control means for applying at least a portion of said voltage signal to said control means to substantially compensate for such amplitude variations as affecting said control means and therefore said chroma amplifier, to maintain the amplitude of said color information components at a level to prevent undesired color saturation of said kinescope display during said increasing load demands.

5. An automatic color control circuit for receivers adapted to receive color television signal transmissions, said receiver being of the type including deflection control circuit means for a kinescope, comprising the combination of, a. first means for deriving operating potentials for said kinescope from said deflection control means, b. second means for deriving keying pulses, during a retrace interval from said deflection control means, said first and second means both being subjected to amplitude variations in response to varying load conditions on said deflection control means, c. a burst amplifier coupled to said second means and responsive to said color television signals for separating and amplifying from said color television signals a burst signal in accordance with the application thereto of one of said keying pulses, said amplification factor of said amplifier being proportional to the amplitude of said keying pulse, d. third means coupled to said burst amplifier for providing at an output thereof a control signal responsive to the amplitude of said burst signal, e. fourth means coupled to said first means and said third means responsive to said amplitude variations to provide at an output thereof a control signal having a magnitude at least in part due to said amplitude variations, when occurring, and as simultaneously affecting said first and second means, whereby any variation in said signal amplitude due to said variation in amplitude of said keying pulse is substantially compensated for at said output of said fourth means.

6. The automatic color control circuit according to claim 5 wherein said third means comprises, a. an oscillator circuit including an active device having an input, output and a common terminal, b. means coupling said input terminal to said burst amplifier, said input terminal and said common terminal providing rectification of said burst signal to provide a DC level at said input terminal according to the amplitude of said burst signal.

7. The automatic color control circuit according to claim 6 wherein said fourth means comprises, a. a transistor arranged in a common base configuration and having an emitter electrode coupled to said input terminal of said active device in said oscillator circuit to provide a ground return path for said input terminal of said device, while further providing amplification of said DC level at said collector electrode, b. means coupled between said emitter electrode of said transistor and said deflection circuit means, for applying to said transistor a signal representative of said amplitude variations, c. a gain controllable chroma amplifier channel responsive to color information components contained in said color television signal transmissions, and d. means coupling said collector electrode of said transistor to said chroma amplifier channel to control the gain thereof in accordance with said control signal whose magnitude is at least in part due to said amplitude variations when occurring.

8. The automatic color control circuit according to claim 5 wherein, said first means further includes a power recovery circuit comprising, a. a unidirectional current carrying device coupled between said deflection means and a point of reference potential, b. filtering means coupled to said unidirectional device, including an inductor for developing a voltage thereacross during a retrace pulse generated by said deflection circuit means, said voltage amplitude being subjected to varying load conditions, c. a capacitor coupled between said inductance and said fourth means for applying at least a portion of said voltage to said fourth means.

9. In a television receiver adapted to receive color television signal transmissions, said receiver being of the type including deflection control circuit means for a kinescope, comprising the combination of, a. first means coupled to said deflection control means for deriving operating potentials for said kinescope, b. second means coupled to said deflection control means for deriving keying pulses during a retrace interval, said operating potentials and said keying pulses both being subjected to amplitude changes in response to varying load conditions on said deflection control means, c. a gain controllable chroma amplifier channel responsive to color information components contained in said color television signal transmissions, for applying said components to said kinescope and thereby affecting said load demands by said kinescope as supplied by said first means, d. a burst amplifier coupled to said second means and responsive to said color television signals for separating and amplifying a color burst signal included in said color television signals in accordance with the application thereto of one of said keying pulses, said amplification factor of said burst amplifier being proportional to the amplitude of said keying pulse, e. third means coupled to said burst separator for providing at an output terminal thereof a potential representative of the amplitude of said burst signal, f. a control circuit having an input and output terminal, said input terminal coupled to said output terminal of said third means and responsive coupled said potential to provide an amplified control voltage at said output terminal representative of the amplitude of said burst signal, for application of said control voltage to said chroma amplifier for controlling the gain thereof according to said control voltage, said control voltage undesirably serving to change said chroma amplifier gain in response to said amplitude variations as affecting said burst signal applied to said third means due to said varying load conditions, g. signal sensing means coupled to said first means responsive to said amplitude variations for providing a first sensing signal at an output thereof at least a portion of which is representative of said variations due to said increasing load conditions, h. means coupled between said signal sensing means and said burst amplifier for providing at an output terminal coupled to said input of said control circuit, a second sensing signal having a magnitude which is at a first predetermined value when said load conditions are such as to keep said amplitude variations within predetermined limits, and of a second value when said load conditions and therefore said amplitude variations exceed said value, said first value being of a magnitude to enable said control circuit to provide a control signal substantially according to said burst amplitude, and said second level being of a magnitude to enable said control circuit to provide said control signal according to said first and second sensing signals and in a direction to decrease said increasing load demands on said kinescope by decreasing the gain of said chroma amplifier, to maintain the level of said color information components at a level to prevent undesired color saturation of said kinescope during said increasing load requirements.

UNITED STATES PATENT OFFICE

CERTIFICATE OF CORRECTION

Patent No. 3,578,903 Dated May 18, 1971

Inventor(s) Donald H. Willis

It is certified that error appears in the above-identified patent and that said Letters Patent are hereby corrected as shown below:

Column 1, line 10, that portion reading "bema current" should read -- beam current --. Column 2, line 28, that portion reading "+v." should read -- +V --. Column 3, line 30, that portion reading "$(+v._1)$" should read -- $(+V_1)$ --. Column 3, line 69, that portion reading "Date" should read -- Data --. Column 4, line 6, that portion reading "capacitor 38" should read -- capacitor 28 --. Column 6, line 55, that portion reading "amplitude due" should read -- amplitude variations due --. Column 8, line 30, that portion reading "responsive coupled said" should read -- responsive to said --.

Signed and sealed this 14th day of September 1971.

(SEAL)
Attest:

EDWARD M.FLETCHER,JR.
Attesting Officer

ROBERT GOTTSCHALK
Acting Commissioner of Patents